United States Patent
Maergner et al.

(10) Patent No.: US 10,672,391 B2
(45) Date of Patent: Jun. 2, 2020

(54) IMPROVING AUTOMATIC SPEECH RECOGNITION OF MULTILINGUAL NAMED ENTITIES

(71) Applicant: Nuance Communications, Inc., Burlington, MA (US)

(72) Inventors: Paul Maergner, Braunschweig (DE); Paul Vozila, Arlington, MA (US); Stefan Hahn, Cologne (DE); Nathan Bodenstab, Houlton, ME (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 15/512,281

(22) PCT Filed: Sep. 26, 2014

(86) PCT No.: PCT/US2014/057665
§ 371 (c)(1),
(2) Date: Mar. 17, 2017

(87) PCT Pub. No.: WO2016/048350
PCT Pub. Date: Mar. 31, 2016

(65) Prior Publication Data
US 2017/0287474 A1    Oct. 5, 2017

(51) Int. Cl.
*G10L 15/18* (2013.01)
*G06F 17/27* (2006.01)
(Continued)

(52) U.S. Cl.
CPC ........ *G10L 15/1815* (2013.01); *G06F 17/271* (2013.01); *G06F 17/277* (2013.01);
(Continued)

(58) Field of Classification Search
None
See application file for complete search history.

(56) References Cited

U.S. PATENT DOCUMENTS 7,162,412 B2 * 1/2007 Yamada .............. G06F 17/2836
704/7
7,249,013 B2 * 7/2007 Al-Onaizan ........ G06F 17/2223
704/2
(Continued)

FOREIGN PATENT DOCUMENTS

EP     2595143 A1    5/2013

OTHER PUBLICATIONS

Sep. 18, 2015—PCT International Search Report—PCT/US2014/057665.
(Continued)

*Primary Examiner* — Neeraj Sharma
(74) *Attorney, Agent, or Firm* — Brian J. Colandreo; Michael T. Abramson; Holland & Knight LLP

(57) ABSTRACT

Methods and systems are provided for improving speech recognition of multilingual named entities. In some embodiments, a list comprising a plurality of named entities may be accessed by a computing device. A first named entity represented in the native language may be compared with the first named entity represented in the foreign language. One or more words that appear in both the first named entity represented in the native language and the first named entity represented in the foreign language may be identified as one or more foreign words. A grapheme-to-phoneme (G2P) conversion may be applied to the one or more foreign words, wherein graphemes of the one or more foreign words are mapped to phonemes in the native language. The G2P conversion may result in a native pronunciation for each of the one or more foreign words, which are added to a recognition dictionary along with the native pronunciations.

20 Claims, 9 Drawing Sheets

(51) Int. Cl.
*G06F 17/28* (2006.01)
*G10L 13/08* (2013.01)
*G10L 15/06* (2013.01)
*G10L 15/22* (2006.01)
*G10L 15/26* (2006.01)
*G10L 15/08* (2006.01)

(52) U.S. Cl.
CPC ........ *G06F 17/278* (2013.01); *G06F 17/2735* (2013.01); *G06F 17/2827* (2013.01); *G10L 13/08* (2013.01); *G10L 15/063* (2013.01); *G10L 15/22* (2013.01); *G10L 15/265* (2013.01); *G10L 2015/088* (2013.01); *G10L 2015/223* (2013.01)

(56) References Cited

U.S. PATENT DOCUMENTS

| | | | |
|---|---|---|---|
| 7,472,061 B1 | 12/2008 | Alewine et al. | |
| 7,937,396 B1* | 5/2011 | Pasca | G06F 17/2795 707/750 |
| 8,326,599 B2* | 12/2012 | Tomeh | G06F 17/2818 704/10 |
| 8,612,205 B2* | 12/2013 | Hanneman | G06F 17/2827 704/2 |
| 8,655,641 B2* | 2/2014 | Kumano | G06F 17/2854 704/2 |
| 8,949,125 B1* | 2/2015 | Chechik | G10L 13/02 701/409 |
| 9,971,763 B2* | 5/2018 | Abdel-Reheem | G06F 17/278 |
| 2007/0294082 A1* | 12/2007 | Jouvet | G10L 15/005 704/231 |
| 2010/0106484 A1* | 4/2010 | U | G06F 17/2223 704/5 |
| 2011/0307245 A1* | 12/2011 | Hanneman | G06F 17/2827 704/4 |
| 2012/0101804 A1* | 4/2012 | Roth | G06F 17/2818 704/2 |
| 2013/0033641 A1* | 2/2013 | Shih | H04N 21/4345 348/484 |
| 2014/0163951 A1* | 6/2014 | Nikoulina | G06F 17/278 704/4 |
| 2014/0337989 A1* | 11/2014 | Orsini | H04L 51/12 726/26 |
| 2014/0379329 A1* | 12/2014 | Dong | G06F 17/2775 704/9 |
| 2015/0120274 A1* | 4/2015 | Forbush | G06Q 10/06 704/2 |
| 2015/0169550 A1* | 6/2015 | Cvijetic | G06F 17/289 704/2 |

OTHER PUBLICATIONS

Oct. 1, 1993—"Using Cognates to Align Sentences in Bilingual Corpora"—M. Simard et al.—Proceedings of 1993 Conference of the Centre for Advanced Studies on Collaborative Research.

* cited by examiner

IMPROVING AUTOMATIC SPEECH RECOGNITION OF MULTILINGUAL NAMED ENTITIES

CROSS-REFERENCE TO RELATED APPLICATIONS

This application is a U.S. National Stage application under 35 U.S.C. § 371 of International Application PCT/US2014/057665 (published as WO 2016/048350 A1), filed Sep. 26, 2014. Benefit of the filing date of this prior application is hereby claimed. The prior application is hereby incorporated by reference in its entirety.

FIELD

Aspects described herein relate to computers and computer software. In particular, one or more aspects of the disclosure are related to speech recognition software applications and to detecting multilingual named entities for speech recognition.

BACKGROUND

Natural language processing (NLP) and natural language understanding (NLU) involve using computer processing to extract meaningful information from natural language inputs (e.g., spoken or text-based). In particular, speech recognition may be employed to determine textual representations of spoken natural language inputs. For example, a user may speak a command or query, and a speech recognition system may transcribe the spoken input. One or more named entities may be detected from the transcription of the command or query. Named entities may comprise one or more elements in a stream of text that correspond to predefined categories (e.g., names of persons, organizations, locations, books, television shows, movie titles, and the like). Named entities may be important for speech recognition in order to process a user's intent behind a spoken command or query.

Various challenges may arise in developing speech recognition systems with increased accuracy in recognizing named entities in speech. In some cases, named entities in a native language may include one or more words in a foreign language. For example, English words may be intermixed with German words in a German named entity.

Conventional speech recognition and natural language processing systems might not be able to detect different combinations of languages or other instances of code switching. Furthermore, there may be issues in distinguishing between words that have conflicting meanings in different languages. For example, a word in a foreign language may be spelled the same as a word in a native language, but both words may have different meanings and pronunciations in their respective languages. Thus, it is difficult to detect foreign words in a native language input using conventional speech recognition and natural language processing systems.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein describe techniques for recognition of foreign words in native languages for improved speech recognition and natural language processing applications, including systems and methods for recognizing multilingual named entities in speech.

One or more aspects of the disclosure describe a method that may include accessing, by a computing device, a list comprising a plurality of named entities, wherein each named entity is represented in a native language and a foreign language. The method may also include comparing a first named entity represented in the native language with the first named entity represented in the foreign language; identifying one or more words that appear in both the first named entity represented in the native language and the first named entity represented in the foreign language, wherein the one or more words are identified as one or more foreign words; and applying a grapheme-to-phoneme conversion to the one or more foreign words, resulting in a native pronunciation for each of the one or more foreign words.

One or more aspects of the disclosure describe a system that includes at least one processor, and at least one memory storing computer-readable instructions that, when executed by the at least one processor, cause the system to perform one or more steps. The steps the system may perform may include accessing a list comprising a plurality of named entities, wherein each named entity is represented in a native language and a foreign language; comparing a first named entity represented in the native language with the first named entity represented in the foreign language; identifying one or more words that appear in both the first named entity represented in the native language and the first named entity represented in the foreign language, wherein the one or more words are identified as one or more foreign words; and applying a grapheme-to-phoneme conversion to the one or more foreign words, resulting in a native pronunciation for each of the one or more foreign words.

One or more aspects of the disclosure describe one or more computer-readable media having instructions stored thereon, which when performed, cause a computing device to perform one or more steps. The steps that the computing device performs may include accessing a list comprising a plurality of named entities, wherein each named entity is represented in a native language and a foreign language; comparing a first named entity represented in the native language with the first named entity represented in the foreign language; identifying one or more words that appear in both the first named entity represented in the native language and the first named entity represented in the foreign language, wherein the one or more words are identified as one or more foreign words; and applying a grapheme-to-phoneme conversion to the one or more foreign words, resulting in a native pronunciation for each of the one or more foreign words.

These and additional aspects will be appreciated with the benefit of the disclosures discussed in further detail below.

BRIEF DESCRIPTION OF THE DRAWINGS

A more complete understanding of the present disclosure and the advantages thereof may be acquired by referring to the following description in consideration of the accompanying drawings, in which like reference numbers indicate like features, and wherein.

DETAILED DESCRIPTION

Figure 1:
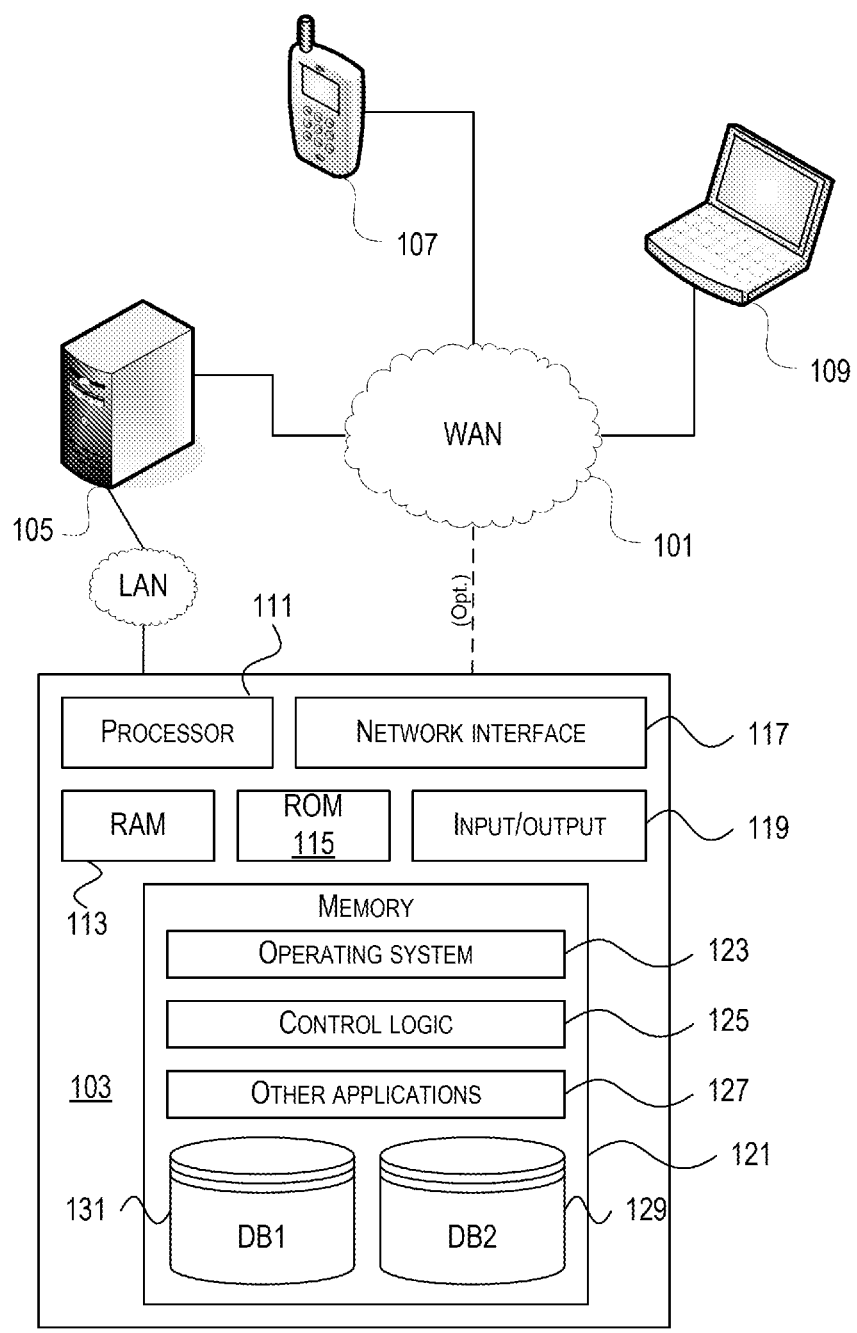
FIG. 1 depicts an illustrative computer system architecture that may be used in accordance with one or more illustrative aspects described herein.

In traditional speech recognition systems, natural language input (e.g., speech input) may be processed for interpretation and transcribed. There may be one or more elements or named entities in a speech input. Named entities may include names of persons, organizations, locations, books, television shows, movie titles, and the like. For instance, named entities may comprise one or more words or phrases in more than one language, resulting in multilingual named entities. In another instance, named entities may comprise one or more words in one language, but the one language may be a foreign language. In different native languages (e.g., German, French, Spanish, and the like), there may be many named entities that contain one or more foreign words (e.g., English words). For example, there may be popular English television shows that are translated and shown in different languages. Titles of the English television shows that are shown in another language may contain some or all of the English words from the original title in English. For example, English television shows such as "The Simpsons" and "How I Met Your Mother" may be translated and referred to as "Die Simpsons" and "How I Met Your Mother", respectively, in German. Additionally, a word in a native language may have the same spelling but a meaning and pronunciation different from a word in a foreign language. For example, the word "die" in German has a different meaning and pronunciation than the word "die" in English. Therefore, conventional speech recognition systems are unable to recognize and accurately interpret such multilingual named entities.

In accordance with aspects of the disclosure, systems and methods for improving speech recognition of multilingual named entities in speech recognition are described herein. A speech recognition system may access a list comprising a plurality of named entities, wherein each named entity is represented in a native language and a foreign language. The list comprising the plurality of named entities may be obtained from a multilingual database that contains named entities represented in multiple languages. Alternatively, the list comprising the plurality of named entities may be obtained from comparing a first list of named entities in the native language and a second list of named entities in the foreign language with string similarity analysis. String similarity analysis may allow the system to detect similarities between two named entities (e.g., two strings) in the first and second lists. The list comprising the plurality of named entities may be compiled based on the results from the string similarity analysis, wherein each named entity is represented in the native language and the foreign language.

The speech recognition system may access the list comprising the plurality of named entities and compare a first named entity represented in the native language with the first named entity represented in the foreign language in order to identify one or more words that appear in both the native language and the foreign language representations. For example, the first named entity may comprise common word(s) or phrase(s) that are present in both the native language and the foreign language representations. The one or more common words or phrases may be identified as one or more foreign words, and a grapheme-to-phoneme (G2P) conversion may be applied to the one or more foreign words to obtain a native pronunciation for each of the one or more foreign words. For example, the one or more common words may be compiled in a list, and the written form of the one or more common words may be mapped to sounds or pronunciations by G2P conversion. The G2P conversion may include mapping graphemes of the one or more foreign words to phonemes in the native language. The G2P conversion may also include using a foreign language dictionary and phoneme mapping. For example, the speech recognition system may employ a foreign language dictionary and a phoneme-to-phoneme (P2P) converter for phoneme mapping. The P2P converter may map phonemes of foreign words in the foreign language dictionary to phonemes in the native language based on one or more algorithms and/or models. This mapping may result in a mapped native pronunciation for each of the foreign words in the foreign language dictionary using the phonemes in the native language, wherein the mapped native pronunciations may be stored in a training dictionary. By accessing the training dictionary, a G2P system (e.g., G2P converter) may be trained based on the mapped foreign-to-native pronunciation for each of the foreign words in the foreign language dictionary.

Additionally, graphemes of the one or more foreign words may be mapped to phonemes in the native language based on the trained G2P system. The speech recognition system may determine a native pronunciation for each of the one or more foreign words through the trained G2P system. The one or more foreign words and the native pronunciation for each of the one or more foreign words may be added to a recognition dictionary. In some embodiments, the one or more foreign words may be added as a token (e.g., as a single word or a multi-word phrase) to the recognition dictionary. Furthermore, the speech recognition system may access the recognition dictionary and utilize the determined native pronunciations for the one or more foreign words to predict pronunciations of natural language inputs. For example, the speech recognition system may receive a natural language input in a native language from a user, wherein the natural language input may comprise one or more words in a foreign language. The speech recognition system may detect the one or more foreign words and access the recognition dictionary to determine and/or predict the pronunciations of the one or more foreign words (e.g., token(s)) in the natural language input. In some embodiments, aspects described herein may be implemented during pre-processing or setup of a speech recognition system. For example, the present disclosure may provide improvements in speech recognition based on updating the recognition dictionary with the pronunciations of the one or more foreign words. Overall, the present disclosure teaches advances in speech recognition of multilingual named entities, with techniques for detecting one or more different languages in natural language inputs from users.

In the following description of the various embodiments, reference is made to the accompanying drawings, which form a part hereof, and in which is shown by way of illustration various embodiments. It is to be understood that other embodiments may be utilized and structural and functional modifications may be made without departing from the scope of the present disclosure. Aspects described herein are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

FIG. 1 illustrates one example of a network architecture and data processing device that may be used to implement one or more illustrative aspects described herein. Various network nodes 103, 105, 107, and 109 may be interconnected via a wide area network (WAN) 101, such as the Internet. Other networks may also or alternatively be used, including private intranets, corporate networks, LANs, wireless networks, personal networks (PAN), and the like. Network 101 is for illustration purposes and may be replaced with fewer or additional computer networks. A local area network (LAN) may have one or more of any known LAN topology and may use one or more of a variety of different protocols, such as Ethernet. Devices 103, 105, 107, 109 and other devices (not shown) may be connected to one or more of the networks via twisted pair wires, coaxial cable, fiber optics, radio waves or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects as described herein. Data server 103 may be connected to web server 105 through which users interact with and obtain data as requested. Alternatively, data server 103 may act as a web server itself and be directly connected to the Internet. Data server 103 may be connected to web server 105 through the network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include RAM 113, ROM 115, network interface 117, input/output interfaces 119 (e.g., keyboard, mouse, display, printer, etc.), and memory 121. I/O 119 may include a variety of interface units and drives for reading, writing, displaying, and/or printing data or files. Memory 121 may further store operating system software 123 for controlling overall operation of the data processing device 103, control logic 125 for instructing data server 103 to perform aspects as described herein, and other application software 127 providing secondary, support, and/or other functionality which may or might not be used in conjunction with aspects of the present disclosure. The control logic may also be referred to herein as the data server software 125. Functionality of the data server software may refer to operations or decisions made automatically based on rules coded into the control logic, made manually by a user providing input into the system, and/or a combination of automatic processing based on user input (e.g., queries, data updates, etc.).

Memory 121 may also store data used in performance of one or more aspects of the disclosure, including a first database 129 and a second database 131. In some embodiments, the first database may include the second database (e.g., as a separate table, report, etc.). That is, the information can be stored in a single database, or separated into different logical, virtual, or physical databases, depending on system design. Devices 105, 107, 109 may have similar or different architecture as described with respect to device 103. Those of skill in the art will appreciate that the functionality of data processing device 103 (or device 105, 107, 109) as described herein may be spread across multiple data processing devices, for example, to distribute processing load across multiple computers, to segregate transactions based on geographic location, user access level, quality of service (QoS), etc.

Figure 2:
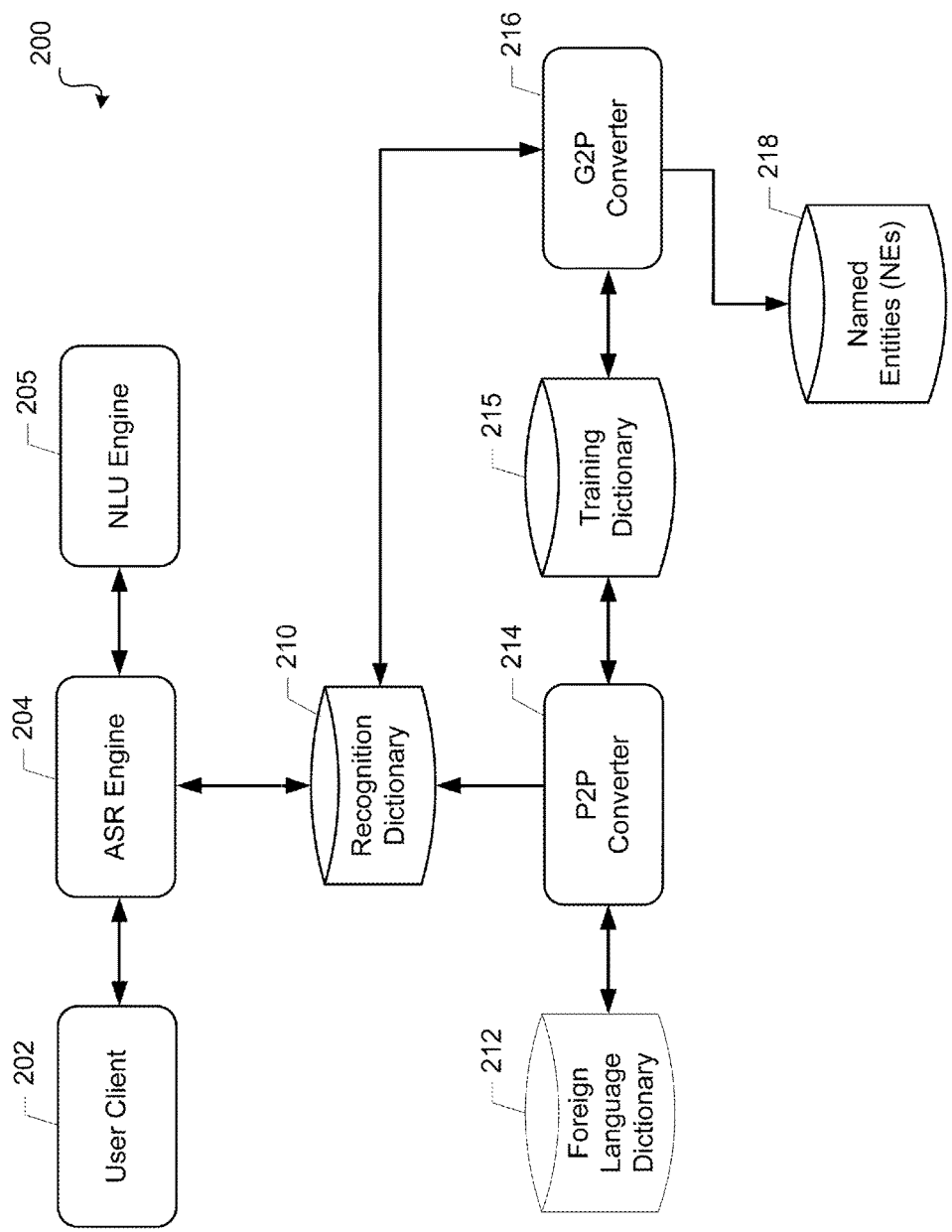
FIG. 2 depicts an illustrative system for speech recognition of multilingual named entities in accordance with one or more illustrative aspects described herein.

FIG. 2 is an illustrative system 200 for speech recognition of multilingual named entities in accordance with one or more features described herein. System 200 may be an automatic speech recognition system with components for detecting multilingual named entities in a natural language input (e.g., speech input) from a user. System 200 may comprise a user client 202, an automatic speech recognition (ASR) engine 204, a natural language understanding (NLU) engine 205, a recognition dictionary 210, a foreign language dictionary 212, a phoneme-to-phoneme (P2P) converter 214, a training dictionary 215, a grapheme-to-phoneme (G2P) converter 216, and a plurality of named entities (NE) 218. The user client 202 may deliver output prompts to a human user (or other entity/device capable of inputting/producing speech/word inputs) and may receive natural language dialogue inputs, including speech inputs from the human user. The user client 202 may be a computing device, such as a mobile device, laptop, and the like, and/or may reside on a computing device or embedded platform. The user client 202 may display a user interface, provide touch input, and the like. In some embodiments, the system may utilize a client-server architecture, for example, where the user client 202 resides on a mobile device.

The ASR engine 204 may be a software and/or hardware component of system 200, and may process speech inputs of users to determine corresponding sequences of representative text words. For example, the ASR engine 204 may produce one or more transcriptions of a speech input. According to some aspects, system 200 may allow for a human-machine dialogue arrangement. For example, system 200 may include multiple computer-implemented dialogue components, which may be configured to intercommunicate and use context to narrow down understanding, recognition, and/or reasoning errors. In some embodiments, system 200 may detect and/or resolve named entities based on linguistic cues, dialogue context, and/or general knowledge. The NLU engine 205 may be a software and/or hardware component of system 200, and may process text words to determine corresponding semantic interpretations. For example, the NLU engine 205 may parse text from the speech input transcribed by the ASR engine 204 and detect one or more named entities. Named entities may comprise names of persons, organizations, locations, books, television shows, movie titles, song titles, and the like. As another example, the NLU engine 205 may parse a transcription and may produce one or more semantic interpretations for each transcription. Additionally, system 200 may include a dialog manager that generates output prompts and responds to semantic interpretations to manage a dialog process with the human user. For example, the dialog manager may continuously be monitoring for any speech input from the user client 202. System 200 may also include a language identification (ID) module or component to detect different languages. For example, the language ID module may be employed to determine to which language each word in a named entity corresponds.

In an embodiment, the ASR engine 204 may process a speech input and access a recognition dictionary 210 to identify one or more named entities in the speech input. The recognition dictionary 210 may be implemented as a data store, database, RAM, ROM, and/or other computer-readable media accessible by one or more components in system 200. The recognition dictionary 210 may store a plurality of named entities and a pronunciation for each of the named entities. A pronunciation may comprise a sequence of phonemes, wherein a phoneme represents the smallest distinctive unit of a spoken language. A phoneme may further be broken down into a set of phones, wherein a phone represents a unit of speech sounds. A phoneme may represent a minimal unit for distinguishing between meanings of words, whereas a phone may represent a smallest identifiable unit found in a stream of speech. Each language may have a set of particular phonemes (e.g., 20-30 phonemes in each language). Some phonemes may be present in multiple languages, whereas other phonemes may be different from language to language. Therefore, different languages may have different pronunciations for a named entity. In some embodiments, the recognition dictionary 210 may include multiple pronunciations for the same named entity. For example, the recognition dictionary 210 may store a native pronunciation and one or more foreign pronunciations (e.g., in different languages) of the same named entity. The ASR engine 204 may access the recognition dictionary 210 to obtain a pronunciation for a named entity in a particular language.

In some embodiments, the ASR engine 204 may receive a speech input from user client 202, wherein the speech input comprises named entities with one or more words or phrases in more than one language (e.g., one or more foreign words or phrases in native language speech input). For example, the ASR engine 204 may receive a speech input comprising multilingual named entities, and the ASR engine 204 may access the recognition dictionary 210 to obtain pronunciations. In order to facilitate detection or speech recognition of the multilingual named entities, the recognition dictionary 210 may be updated by a phoneme-to-phoneme (P2P) converter 214 and a grapheme-to-phoneme (G2P) converter 216 to obtain native pronunciations for each of one or more foreign words in a named entity.

The P2P converter 214 may be a software and/or hardware component of system 200, and may map phonemes in a foreign language to phonemes of a native language. A phoneme represents the smallest distinctive unit of a spoken language. In an embodiment, the P2P converter 214 may employ a parser and/or a lexical analyzer to conduct phoneme mapping. In order to handle pronunciations of one or more foreign words, the P2P converter 214 may access a foreign language dictionary 212. The foreign language dictionary 212 may comprise a list of foreign words (e.g., words in a foreign language), along with corresponding foreign pronunciations for each of the words. For example, the foreign language may be English, and the foreign language dictionary 212 may comprise English words with English pronunciations. In an embodiment, the foreign words in the foreign language dictionary 212 may be referred to as tokens. The P2P converter 214 may link phonemes of the foreign words in the foreign language dictionary 212 to phonemes of a native language. For example, the native language may be German, and the P2P converter 214 may associate English phonemes in the English words with German phonemes. In some embodiments, a phoneme in a foreign language might not be present in a native language or vice versa. Thus, the P2P converter 214 may map the phoneme in the foreign language to the closest available phoneme in the native language.

The P2P converter 214 may employ different types of mapping to link phonemes from one language to phonemes from another language. For example, the P2P converter 214 may employ a context-independent mapping or a context-dependent mapping. The different types of mapping employed by the P2P converter 214 may be based on one or more algorithms and/or models, such as acoustic models, Hidden Markov models, and other language models (e.g., n-gram model). In some embodiments, the P2P converter 214 may employ decision trees or neural networks for the phoneme mapping.

The mapping of phonemes of foreign words in the foreign language dictionary 212 to phonemes in the native language may result in a mapped native pronunciation for each of the foreign words in the foreign language dictionary 212 using the phonemes in the native language. For example, the mapping may result in a list of English words with corresponding pronunciations using German phonemes. The training dictionary 215 may store the mapped native pronunciation for each of the foreign words in the foreign language dictionary 212 (e.g., a foreign-to-native pronunciation for each of the foreign words). In some cases, the training dictionary 215 may store the mapped native pronunciations and the foreign pronunciations for each of the foreign words). In other words, the training dictionary 215 may be the same as a mapped foreign language dictionary 212. The training dictionary 215 may then be used to train the G2P converter 216 based on the mapped native pronunciation for each of the foreign words in the foreign language dictionary 212.

The G2P converter 216 may be a software and/or hardware component of system 200, and may map graphemes in text to phonemes in speech. A grapheme represents the smallest unit of a written language. For example, phonemes may represent distinctive sounds heard in spoken words, whereas graphemes may comprise written symbols or letters that represent those distinctive sounds. The G2P converter 216 may predict a phonemic representation of a word given its written form. In some embodiments, the G2P converter 216 may be referred to as a G2P system or a G2P module. In an embodiment, the G2P converter 216 may employ a parser and/or a lexical analyzer to conduct mapping of graphemes to phonemes. The different types of mapping employed by the G2P converter 216 may be based on one or more algorithms and/or models, such as acoustic models, Hidden Markov models, and other language models (e.g., n-gram model). In some embodiments, the G2P converter 216 may employ decision trees or neural networks for mapping. Furthermore, the G2P converter 216 may be trained (e.g., via the training dictionary 215) based on the mapped native pronunciations to recognize or identify new foreign words and predict native pronunciations. For example, the G2P converter 216 may be trained to automatically identify graphemes in English words and interpret them as phonemes for a German pronunciation of the English words. Pronunciations of new foreign words (e.g., named entities with foreign words that are not currently in the recognition dictionary 210) might not need to be manually entered (e.g., wherein pronunciations are recorded by a linguist) into the recognition dictionary 210 because the G2P converter 216 may be able to automatically determine pronunciations after being trained based on the mapped native pronunciations stored in the training dictionary 215. After training the G2P converter 216 based on the mapping, the G2P converter 216 may be employed by the speech recognition system (e.g., system 200) to predict pronunciations for any named entities comprising one or more foreign words.

Figure 3:
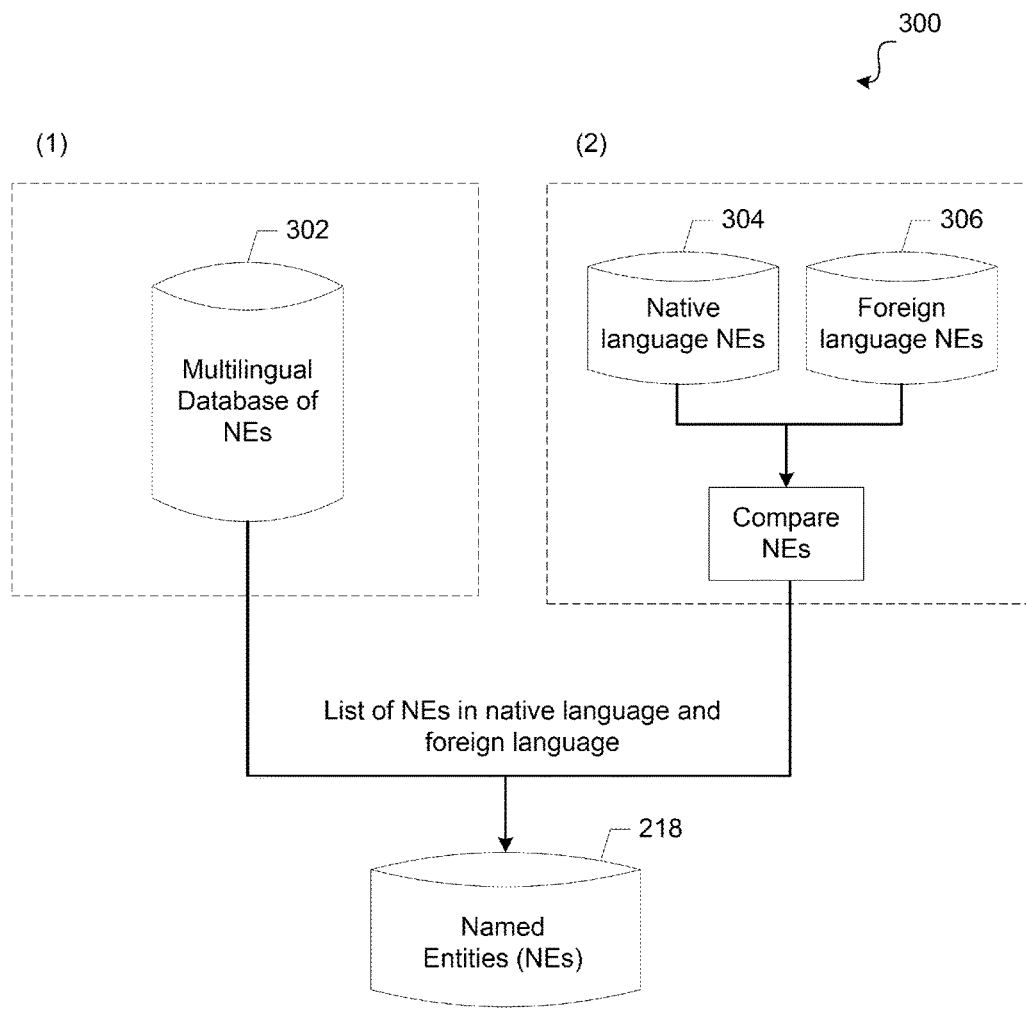
FIG. 3 depicts an illustrative diagram of the compilation of the plurality of named entities for recognizing multilingual named entities in accordance with one or more illustrative aspects described herein.

In order to facilitate with recognition of multilingual named entities, the G2P converter 216 may access a plurality of named entities 218. The plurality of named entities 218 may be stored in a database, a data store, RAM, ROM, and/or other computer-readable media accessible by one or more components in system 200. For example, the plurality of named entities 218 may be stored as a list comprising the named entities 218. Each named entity 218 may be represented in a native language and a foreign language. In some embodiments, each named entity 218 may be represented in more than one foreign language. Referring now to FIG. 3, illustrative diagram 300 depicts compilation of the plurality of named entities 218 for recognizing multilingual named entities in accordance with one or more features described herein. FIG. 3 illustrates ways of compiling the plurality of named entities 218. In an embodiment, the plurality of named entities 218 may be compiled from a multilingual database of named entities 302. The multilingual database of named entities 302 may represent a collection of named entities, wherein each named entity is represented in multiple languages. For example, the multilingual database of named entities 302 may be Wikipedia, Internet Movie Database (IMDb), or a similar database. Wikipedia comprises an online encyclopedia with millions of articles on different subjects, whereas IMDb comprises a database of entries related to films, television programs, video games, and the like. The title of each article and entry in Wikipedia and IMDb, respectively, may represent a named entity. Each article and entry in Wikipedia and IMDb, respectively, may be represented in multiple languages. Thus, the plurality of named entities 218 may be compiled from the multilingual database of named entities 302, along with representations of each named entity in a native language and a foreign language.

In some embodiments, the multilingual database of named entities 302 may be unavailable for speech recognition. Therefore, as an alternative, the plurality of named entities 218 may be compiled by comparing a list of named entities in the native language 304 and a list of named entities in the foreign language 306. The native language named entities 304 may be compared with the foreign language named entities 306 to determine links between named entities. For example, the native language named entities 304 might not previously be linked to the foreign language named entities 306, wherein the entities in each list may be in any random order. Table 1 illustrates example lists of native language named entities 304 and foreign language named entities 306, wherein the named entities are unlinked.

TABLE 1

Lists of Named Entities in Native and Foreign Languages (unlinked)

| List of Named Entites in Native Language | List of Named Entities in Foreign Language |
| --- | --- |
| CSI: Den Tätern auf der Spur | Suburgatory |
| Dr. House | Two and a Half Men |
| Suburgatory | Bones |
| Die Simpsons | Desperate Housewives |
| Desperate Housewives | Grey's Anatomy |
| Bones - Die Knochenjägerin | The Simpsons |
| Grey's Anatomy - Die jungen Ärzte | House M.D. |
| Two and a Half Men | CSI: Crime Scene Investigation |

The named entities shown in Table 1 are examples of TV show titles, wherein the native and foreign languages are German and English, respectively. Although the examples disclosed herein refer to the native and foreign languages as German and English, respectively, any combination of languages may be utilized in the present disclosure. For example, the native language may be English, whereas the foreign language may be Spanish. The systems and methods described herein may be employed with named entities in any combination of languages. In an embodiment, there may be any number of named entities in the list of named entities in the native language 304 and in the list of named entities in the foreign language 306. In an embodiment, the ASR engine 204 may perform the comparison of native language named entities 304 and foreign language named entities 308. The native language named entities 304 and the foreign language named entities 306 may be compared with string similarity analysis. String similarity analysis may allow detection of similarities between two named entities (e.g., two strings) in the list of named entities in the native language 304 and in the list of named entities in the foreign language 306. String similarity analysis may utilize one or more string metrics to measure similarity or dissimilarity between two named entities. In an embodiment, string similarity analysis may comprise at least one of edit distance analysis, longest common substring (LCS) analysis, and other similar string metrics. Edit distance may represent a number of editing operations (e.g., deletions, insertions, or substitutions) needed to transform a native language named entity 304 to a foreign language named entity 306. Longest common substring may represent the longest string that is a substring of two or more strings. In an embodiment, there may be one or more predetermined algorithms or computations for calculating the edit distances or longest common substrings for all of the named entities.

Native language named entities 304 may be linked to corresponding foreign language named entities 306 based on the string similarity analysis. For example, there may be a minimum edit distance desired for linking a native language named entity 304 to a foreign language named entity 306. In an embodiment, a particular native language named entity 304 may be linked with a particular foreign language named entity 306 if the value of the calculated edit distance between the two named entities is at least the minimum edit distance value. For example, a smaller edit distance between two named entities may indicate that the two named entities are more similar than another pair of named entities with a larger edit distance. In an embodiment, a particular native language entity 304 may be linked with a particular foreign language named entity 306 if the edit distance between the two named entities is less than any of the other computed edit distances between the particular native language entity 304 and other corresponding foreign language named entities 306. For example, the edit distance between "Die Simpsons" and "The Simpsons" may be calculated as two because there are two substitutions for transforming the [d] to [t] and the [i] to [h] between the named entities. Upon further analysis, the edit distances between "Die Simpsons" and any other foreign language named entity 306 listed in Table 1 may be calculated to be greater than two. Therefore, the native language named entity "Die Simpsons" and the foreign language named entity "The Simpsons" may be linked together and compiled in the plurality of named entities 218.

As another example, there may be a minimum longest common substring length desired for linking a native language named entity 304 to a foreign language named entity 306. In an embodiment, a particular native language named entity 304 may be linked with a particular foreign language named entity 306 if the length of the longest common substring between the two named entities is at least the minimum longest common substring length. In another embodiment, a particular native language entity 304 may be linked with a particular foreign language named entity 306 if the longest common substring between the two named entities is longer than any of the other computed longest common substrings between the particular native language entity 304 and other corresponding foreign language named entities 306. For example, the longest common substring between "Die Simpsons" and "The Simpsons" may be computed as "Simpsons" Upon further analysis, the common substrings between "Die Simpsons" and any other foreign language named entity 306 listed in Table 1 might not be as long as the substring "Simpsons." Thus, the native language named entity "Die Simpsons" and the foreign language named entity "The Simpsons" may be linked together based on the longest common substring analysis.

Similarly, each of the named entities in Table 1 may be compared based on string similarity analysis and linked according to results of the string similarity analysis (e.g., through edit distance analysis, longest common substring analysis, or by other similar string metrics). Table 2 illustrates a compiled list of linked native language named entities 304 and foreign language named entities 306, wherein the list is compiled based on results of the string similarity analysis.

TABLE 2

Compiled List of Linked Named Entities in Native and Foreign Languages

| Named Entites in Native Language | Named Entities in Foreign Language |
| --- | --- |
| CSI: Den Tätern auf der Spur | CSI: Crime Scene Investigation |
| Dr. House | House M.D. |
| Suburgatory | Suburgatory |
| Die Simpsons | The Simpsons |
| Desperate Housewives | Desperate Housewives |
| Bones - Die Knochenjägerin | Bones |
| Grey's Anatomy - Die jungen Ärzte | Grey's Anatomy |
| Two and a Half Men | Two and a Half Men |

The compiled list shown in Table 2 may correspond to the plurality of named entities 218, wherein each named entity is represented in the native language and the foreign language.

In an embodiment, the list comprising the plurality of named entities 218 may be pre-modified for use in the speech recognition system (e.g., system 200). The system may access the plurality of named entities 218 and determine a subset of named entities that match at least one predefined criterion. The at least one predefined criterion may be based on at least one of meta information (e.g., information regarding the named entities), string similarity metric, or a language identification. The system may then remove the subset of named entities from the list comprising the plurality of named entities 218. For example, a list comprising the plurality of named entities 218 may include a plurality of TV show titles. The system may determine that a number of the titles correspond to TV shows that did not originate in an English-speaking country. The system may then modify the list by removing TV shows that did not originate in an English-speaking country from the list. This modification may result in a list comprising only TV shows that originated in an English-speaking country (e.g., TV shows from the United States).

Figure 4:
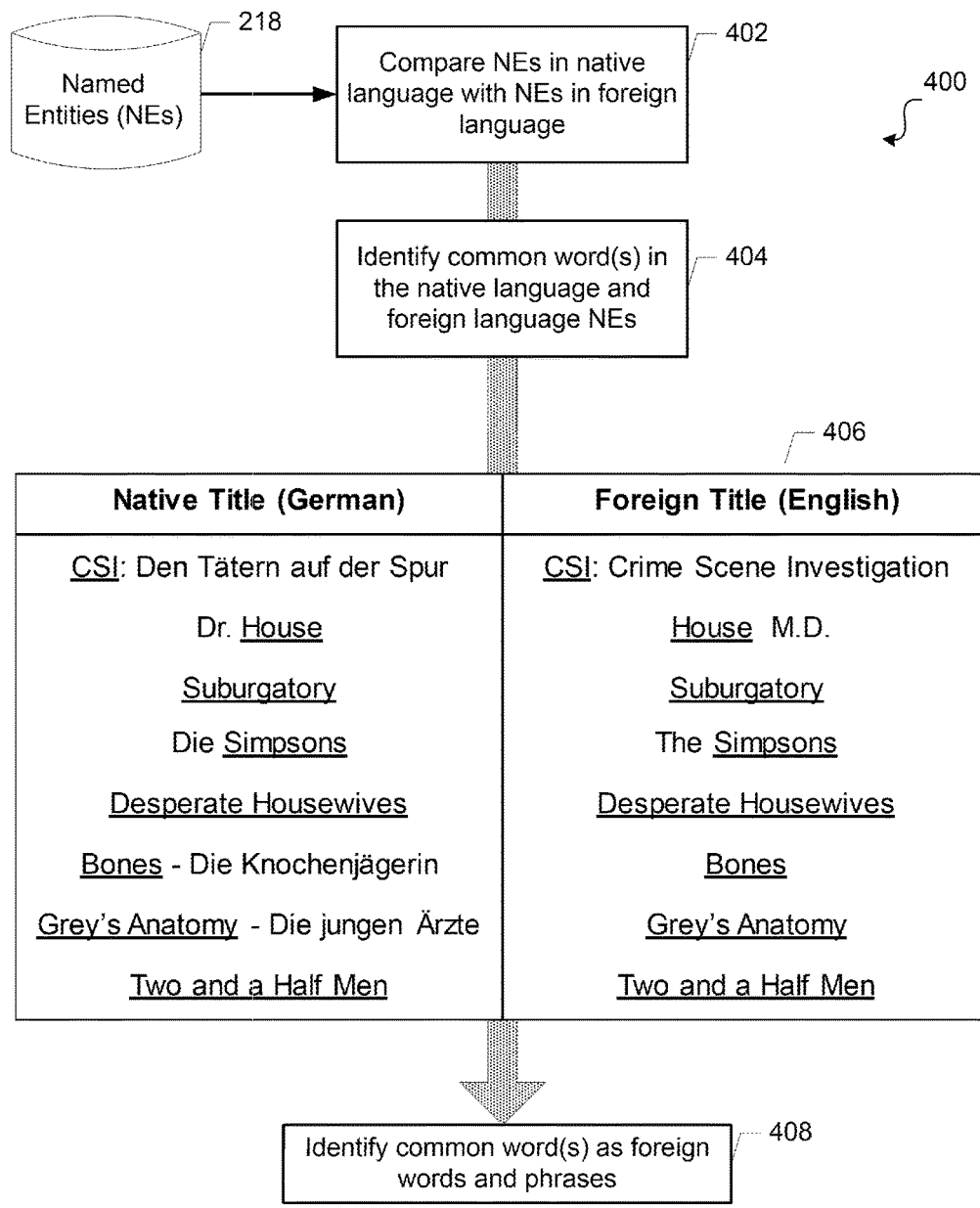
FIG. 4 depicts an illustrative diagram of the identification of one or more foreign words in the plurality of named entities in accordance with one or more illustrative aspects described herein.

Referring now to FIG. 4, illustrative diagram 400 depicts identification of one or more foreign words in the plurality of named entities 218 in accordance with one or more features described herein. At block 402 of FIG. 4, a first named entity in a native language may be compared with the corresponding first named entity in a foreign language. In other words, a native language representation of a first named entity may be compared with a foreign language representation of the first named entity. This comparison may be performed by parsing each string of text corresponding to the native language named entity and the foreign language named entity. Specific letters, words, or phrases may be parsed in each string. Based on the comparison, at block 404, one or more common words may be identified in the first named entity in the native language and the first named entity in the foreign language. FIG. 4 also depicts table 406 comprising examples of results of comparing native language named entities with corresponding foreign language named entities. The one or more common words identified between the native language named entities and the corresponding foreign language named entities are underlined. For example, a native language named entity may be "CSI: Den Tätern auf der Spur," and a corresponding foreign language named entity may be "CSI: Crime Scene Investigation." Based on the comparison (e.g., parsing of the two strings), "CSI" may be identified as the common word and/or phrase between the native language named entity and the foreign language named entity. In another example, "Dr. House" may be the native language named entity, and "House M.D." may be the foreign language named entity. Upon comparison of the two strings, "House" may be identified as the common word between the native language named entity and the foreign language named entity. At block 408, each of the one or more common words and/or phrases may be identified as foreign words and/or phrases. With respect to the aforementioned examples, "CSI" and "House" may be recognized as foreign (e.g., English) words. Table 3 illustrates examples of the one or more common words and/or phrases that are identified as foreign words and/or phrases.

TABLE 3

Identified Foreign Words of the Named Entities in Native and Foreign Languages

| Named Entites in Native Language | Named Entities in Foreign Language | Identified Foreign Words |
| --- | --- | --- |
| CSI: Den Tätern auf der Spur | CSI: Crime Scene Investigation | CSI |
| Dr. House | House M.D. | House |
| Suburgatory | Suburgatory | Suburgatory |
| Die Simpsons | The Simpsons | Simpsons |
| Desperate Housewives | Desperate Housewives | Desperate Housewives |
| Bones - Die Knochenjägerin | Bones | Bones |
| Grey's Anatomy - Die jungen Ärzte | Grey's Anatomy | Grey's Anatomy |
| Two and a Half Men | Two and a Half Men | Two and a Half Men |

Furthermore, there may be additional and/or alternative methods employed for identifying one or more foreign words in the plurality of named entities 218. The method employed for identifying the one or more foreign words may be determined based on the type of named entities. In an embodiment, the plurality of named entities may comprise names of people (e.g., names of actors). Names of people might not be translated in different languages. As an example, the actor Brad Pitt may be known by the same name in both the English and German languages. In another embodiment, the plurality of named entities may comprise song titles, wherein the song titles may be the same in every country and/or language. In these types of named entities, the named entity in a native language may be the same as the named entity in the foreign language.

Therefore, in order to identify the one or more foreign words in certain named entities, the speech recognition system may employ a language identification (ID) module to determine to which language each word in a named entity corresponds. The corresponding foreign and native languages in each named entity may be determined based on the results from the language ID module (e.g., based on string similarity analysis (e.g., edit distance analysis), character sequences, word frequencies in native and foreign text, meta information, or the like).

In an embodiment, some character sequences (e.g., sequence of letters) are more common in one language than in another language. These common character sequences may be used to determine whether one or more words belong to a native language or to a foreign language. In another embodiment, the language ID module may be trained based on an assumption that one or more native words occur more frequently in a native language and that one or more foreign words occur more frequently in a foreign language. The language ID module may be able to determine whether or not a word is in a foreign language or in a native language based on this assumption. In another embodiment, the language ID module may identify one or more foreign words based on meta information. Meta information may comprise additional information regarding the named entities. For example, if the named entities comprise actor names, the language ID module may use meta information, such as nationality or place of birth, to determine whether an actor name is likely to be foreign. Therefore, the speech recognition system (e.g., system 200) may employ one or more of the methods described herein to identify one or more foreign words in the plurality of named entities 218.

Upon identification of the one or more foreign words, in some embodiments, the speech recognition system (e.g., system 200) may employ a post-processing step to remove certain entries from the one or more foreign words. For example, certain entries in the one or more foreign words may consist of only symbols. In another example, certain entries in the one or more foreign words may comprise short words (e.g., words that consist of only one or two letters). The speech recognition system may first determine a subset of the one or more foreign words that match at least one predefined metric, such as word length, word type (e.g., symbols or characters), and the like. The speech recognition system may then remove the subset of foreign words (e.g., certain entries) from the one or more identified foreign words. For example, a named entity may be represented as "Krieg & Frieden" and "War & Peace" in German and English, respectively. After comparing the two named entities (e.g., by parsing the two strings), the symbol "&" may be determined to be the common word and thus identified as a foreign word. Therefore, the speech recognition system may utilize the aforementioned post-processing step to remove the symbol "&" from the one or more identified foreign words. This post-processing may help narrow the one or more identified foreign words to actual foreign words to be added to the recognition dictionary.

Figure 5:
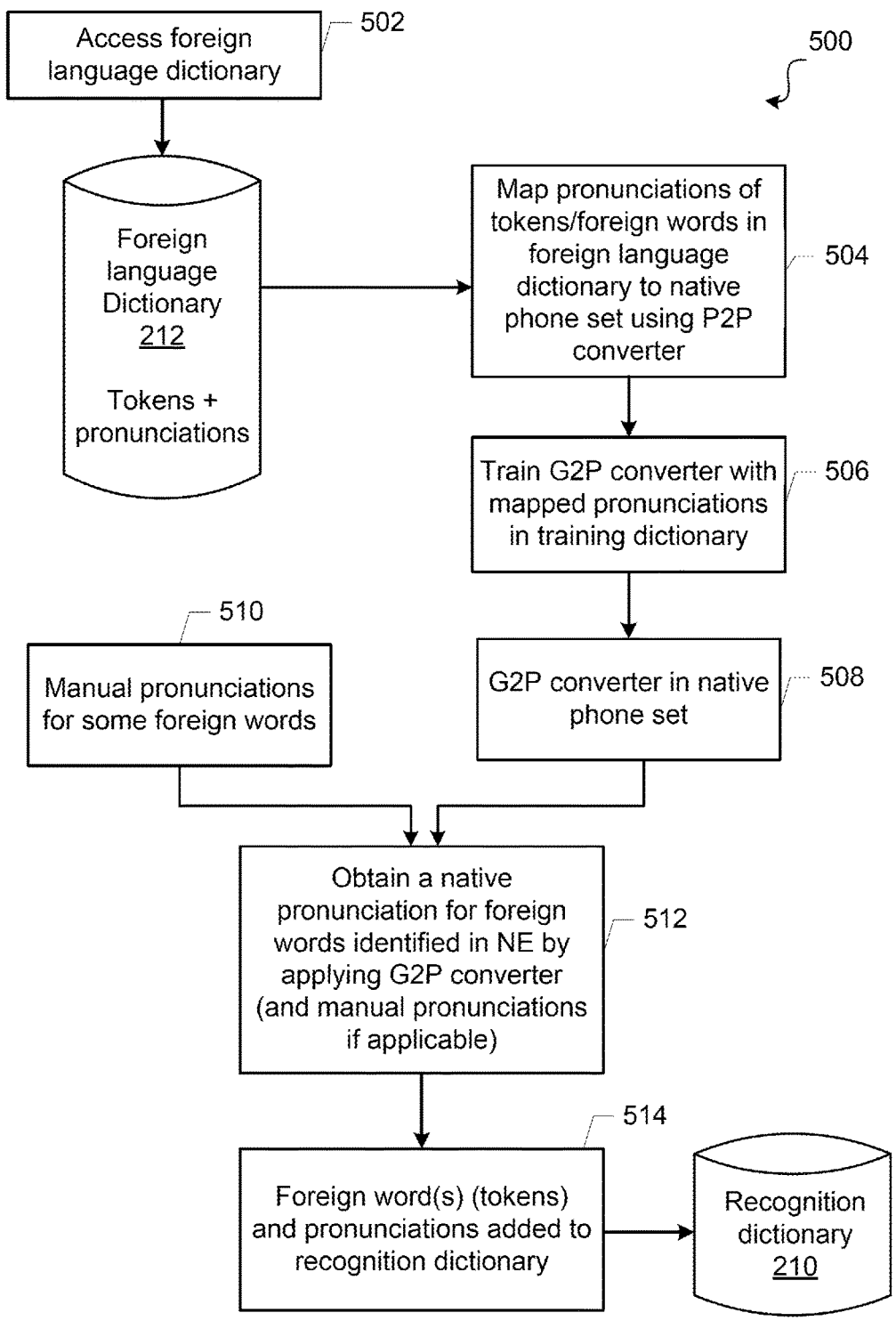
FIG. 5 depicts an illustrative diagram of G2P conversion based on mapping foreign pronunciations to native pronunciations for recognizing multilingual named entities in accordance with one or more illustrative aspects described herein.

FIG. 5 depicts an illustrative diagram 500 of G2P conversion based on mapping foreign pronunciations to native pronunciations for recognizing multilingual named entities in accordance with one or more features described herein. In an embodiment, the mapping may be performed by the P2P converter 214 and the G2P converter 216 in order to obtain native pronunciations for multilingual named entities. At block 502 of FIG. 5, the P2P converter 214 may access the foreign language dictionary 212. The foreign language dictionary 212 may comprise foreign words (e.g., tokens), along with a foreign pronunciation for each of the foreign words. In an embodiment, the foreign pronunciation for each of the foreign words may be represented as a sequence of phonemes in the foreign language. At block 504, the P2P converter 214 may map the foreign pronunciation for each of the foreign words to phonemes in a native phone set. In other words, the P2P converter 214 may map the phonemes of the foreign words in the foreign language dictionary 212 to phonemes in the native language. For example, the P2P converter 214 may map English phonemes in the English words with German phonemes, wherein the native and foreign languages are German and English, respectively. In some cases, phonemes in a foreign language might not be present in a native language. For example, the German language might not have a sound for "th" (e.g., an English sound) as a phoneme. Thus, for English words with the "th" sound (e.g., "mother"), the P2P converter 214 may map the "th" phoneme in English with a closest existing phoneme in German (e.g., "z"). The mapping may result in a mapped native pronunciation for each of the foreign words in the foreign language dictionary 212 using the phonemes in the native language, wherein the mapped native pronunciation for each of the foreign words is stored in the training dictionary 215. For example, the training dictionary 215 may store German pronunciations (e.g., German phonemes) for English words. At block 506, the G2P converter 216 may be trained based on the mapped native pronunciations stored in the training dictionary 215. The G2P converter 216 may be trained to identify graphemes of foreign words and automatically interpret them as phonemes in the native language. For example, the G2P converter 216 may be trained to identify graphemes in English words and interpret them as phonemes for a German pronunciation of the English words. The training of the G2P converter 216 may be based on one or more models, such as acoustic models, non-acoustic pronunciation guessing models, n-gram models, and the like. In an embodiment, the G2P converter 216 may be used to pronounce new words based on the training dictionary 215. The training in block 506 may result in the specialized G2P converter 216 in block 508. For example, the G2P converter 216 may be specialized in being able to process foreign words and predict a native pronunciation for each of the foreign words (e.g., a pronunciation of each foreign word using phonemes in the native language).

In addition to the trained and/or specialized G2P converter 216, at block 510, manual pronunciations of foreign words may also be applied for recognition of multilingual named entities. Manual pronunciations for a subset of foreign words may be provided by a separate dictionary in the native language. In an embodiment, a native language dictionary may include manual pronunciations for foreign words, and may reflect pronunciations that better reflect how a native speaker may pronounce the foreign words. The pronunciations in the native language dictionary may comprise common pronunciation errors that a native speaker may make. For example, some English words (e.g., the word "Internet"), along with their pronunciations, may be used commonly in German and may be present in a German dictionary. Thus, available pronunciations for these foreign words in the native language dictionary may be employed if these foreign words are identified in a named entity. At block 512, a native pronunciation for one or more foreign words identified in a named entity may be obtained by applying the specialized G2P converter 216 to predict pronunciations and, if applicable, by employing manual pronunciations that are available in the foreign language dictionary. For example, in a German named entity such as "Die Simpsons", the word "Simpsons" may be identified as the foreign word in English, and a native pronunciation may be generated by applying G2P conversion (e.g., resulting in a German pronunciation of the English word "Simpsons"). At block 514, the one or more foreign words identified in the named entity and the native pronunciation for each of the foreign words may be added to the recognition dictionary 210. In an embodiment, the one or more foreign words may be added as tokens (e.g., single word or multi-word phrases) to the recognition dictionary 210. For example, the word "Simpsons" may be added to the recognition dictionary 210 as a token, along with the German pronunciation of the word. In some embodiments, the one or more foreign words in a named entity may comprise numbers and/or symbols. The numbers and/or symbols may be translated to a spoken form using a tokenizer that interfaces with at least one of the ASR engine 204, the NLU engine 205, the P2P converter 214, and/or the G2P converter 216. For example, the multi-word "2 Fast 2 Furious" may be translated to the token "Two Fast Two Furious" (e.g., or "Too Fast Too Furious"), and the multi-word "Law & Order" may be translated to the token "Law and Order." Furthermore, the ASR engine 204 may use added tokens in the recognition dictionary 210 to identify specific named entities in various speech inputs.

Figure 6:
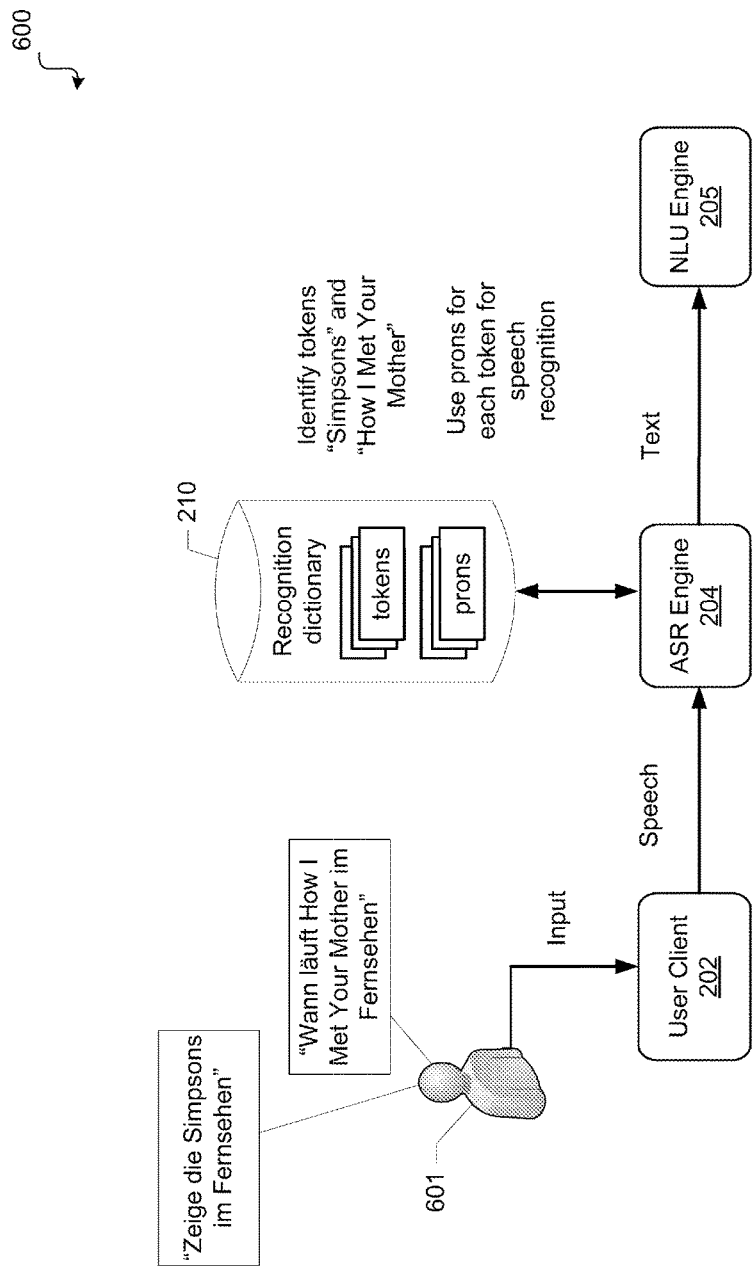
FIG. 6 depicts an illustrative diagram of recognizing multilingual named entities in speech inputs in accordance with one or more illustrative aspects described herein.

FIG. 6 depicts an illustrative diagram 600 of recognizing multilingual named entities in speech inputs in accordance with one or more features described herein. Diagram 600 illustrates processing speech inputs from a user 601 and utilizing recognition dictionary 210 to recognize multilingual named entities. The user 601 may make a statement (e.g., a query or a command) in a native language (e.g., German). For example, the user may make a statement such as "Zeige die Simpsons im Fernsehen" in German, which translates to "Show The Simpsons on TV" in English. The user 601 may also make a query such as "Warm läuft How I Met Your Mother im Fernsehen" in German, which translates to "When is How I Met Your Mother on TV" in English. In both of these examples, the user client 202 may receive the speech input from the user 601 and transmit the speech input to the ASR engine 204. The ASR engine 204 may process the speech input of the user 601 to determine corresponding sequences of representative text words. The ASR engine 204 may access the recognition dictionary 210 to identify one or more named entities in the speech input. The recognition dictionary 210 may store a plurality of named entities and a pronunciation for each of the named entities. In an embodiment, the recognition dictionary 210 may store tokens, wherein each token indicates a single word or a multi-word phrase. During pre-processing of the speech recognition system, the ASR engine 204, the P2P converter 214, and/or the G2P converter 216 may add one or more foreign words as tokens to the recognition dictionary 210 beforehand by applying G2P conversion to determine native pronunciations for each of the one or more foreign words. This may result in an improved recognition dictionary 210. For example, the single word "Simpsons" and the multi-word phrase "How I Met Your Mother" may be stored as tokens in the recognition dictionary 210, along with corresponding native pronunciations (e.g., pronunciations of the English tokens using German phonemes). The ASR engine 204 may subsequently identify the two tokens in the speech inputs. The ASR engine 204 may determine the corresponding native pronunciation for each token stored in the recognition dictionary 210. The ASR engine 204 may use the native pronunciations for the tokens to perform speech recognition of the speech input. The ASR engine 204 may subsequently produce a corresponding transcription of the speech input (e.g., such as for a dictation). In an embodiment, the corresponding transcription of the speech input may be transmitted to the NLU engine 205. The NLU engine 205 may parse the text of the speech input (e.g., the transcription) and process the query or command from the user 601.

Recognition of multilingual named entities as described herein may be useful for a variety of purposes and in various settings. In an embodiment, a user may conduct a voice-based search for information associated with a particular named entity in a database. For example, a user may wish to search for a movie or television show title in Wikipedia, IMDb, or another media database. A user may also utilize speech recognition technology for dictation of speech inputs. For example, a user may wish to dictate an email or a message to a friend. In another example, a user may conduct a voice-based search using a speech-based personal assistant application such as SIRI, NINA, Dragon Mobile Assistant, and the like.

Figure 7:
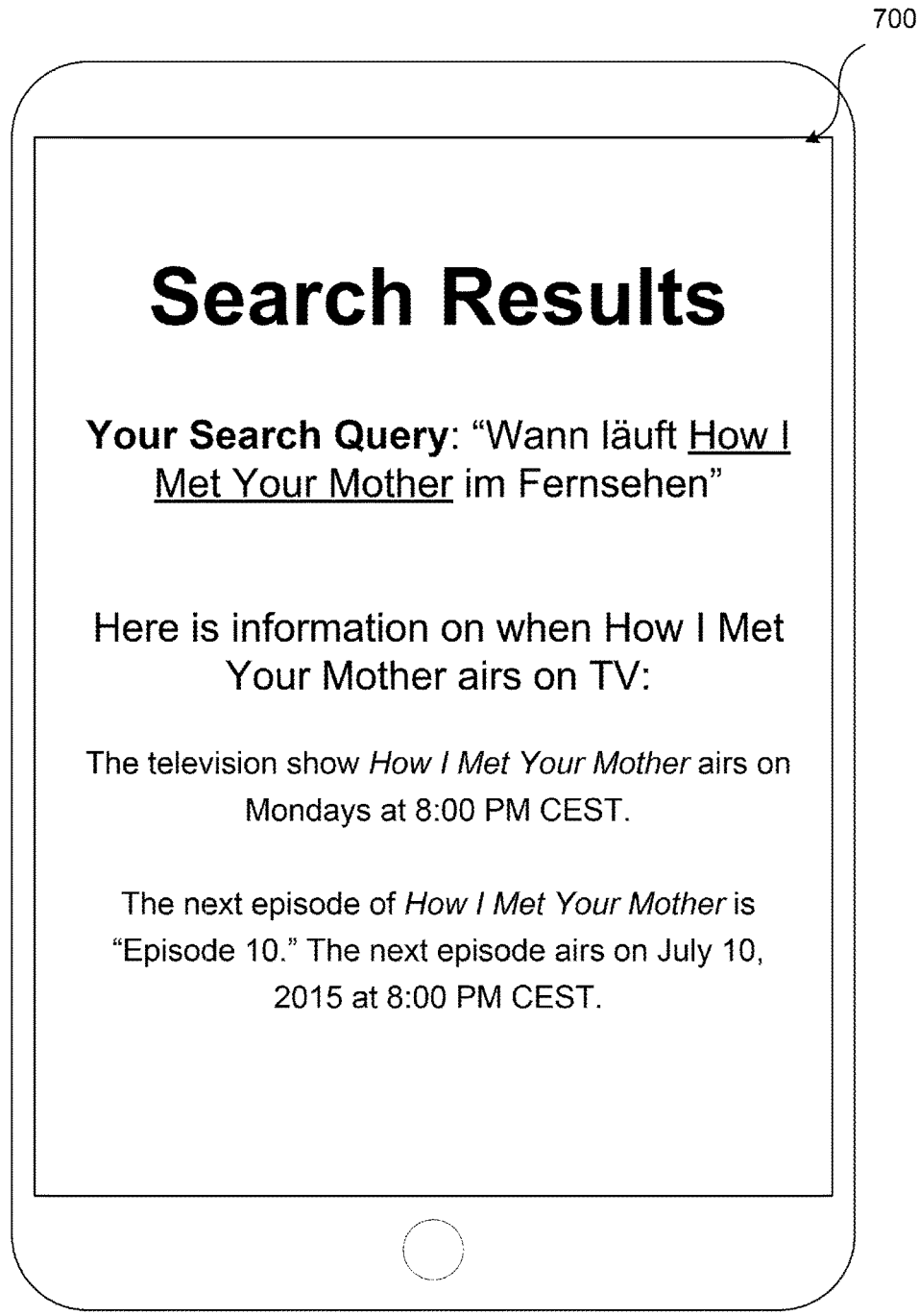
FIG. 7 depicts an illustrative diagram of an example of a graphical user interface after performing speech recognition in accordance with one or more features described herein.

FIG. 7 is an illustrative diagram of an example of a graphical user interface 700 after performing speech recognition in accordance with one or more features described herein. Specifically, user interface 700 illustrates results from a voice-based search using a speech-based personal assistant application. In an embodiment, user interface 700 may be displayed by a user client 202, such as on a mobile device. In this example, the user associated with user client 202 may make a statement in a native language (e.g., German) such as "Warm läuft How I Met Your Mother im Fernsehen", which may be translated to "When is How I Met Your Mother on TV" in English. The user client 202 may transmit the statement as a speech input to the ASR engine (e.g., ASR engine 204), wherein the ASR engine may process the speech input by accessing a recognition dictionary (e.g., recognition dictionary 210) for identifying multilingual named entities and for corresponding pronunciations of one or more foreign words. For example, the ASR engine may identify "How I Met Your Mother" as a token and retrieve a native pronunciation for the token based on the recognition dictionary. The ASR engine may then use the native pronunciation of the token to perform speech recognition (e.g., identifying the foreign (English) words in the native language (German) input).

After performing speech recognition using the recognition dictionary, the ASR engine may transmit a transcription (e.g., text words) to the NLU engine (e.g., NLU engine 205). The NLU engine may process the text words to determine corresponding semantic interpretations. For instance, the NLU engine may interface with a dialog manager to provide voice-based search results to the user. The dialog manager may generate output prompts and respond to the semantic interpretations so as to manage a dialog process with the user. As illustrated in FIG. 7, the results of the voice-based search may be provided and displayed in user interface 700. In some embodiments, all text or a portion of the text displayed on user interface 700 may be presented in any language (e.g., German, French, Spanish, and the like) corresponding to the native language of the user.

Figure 8:
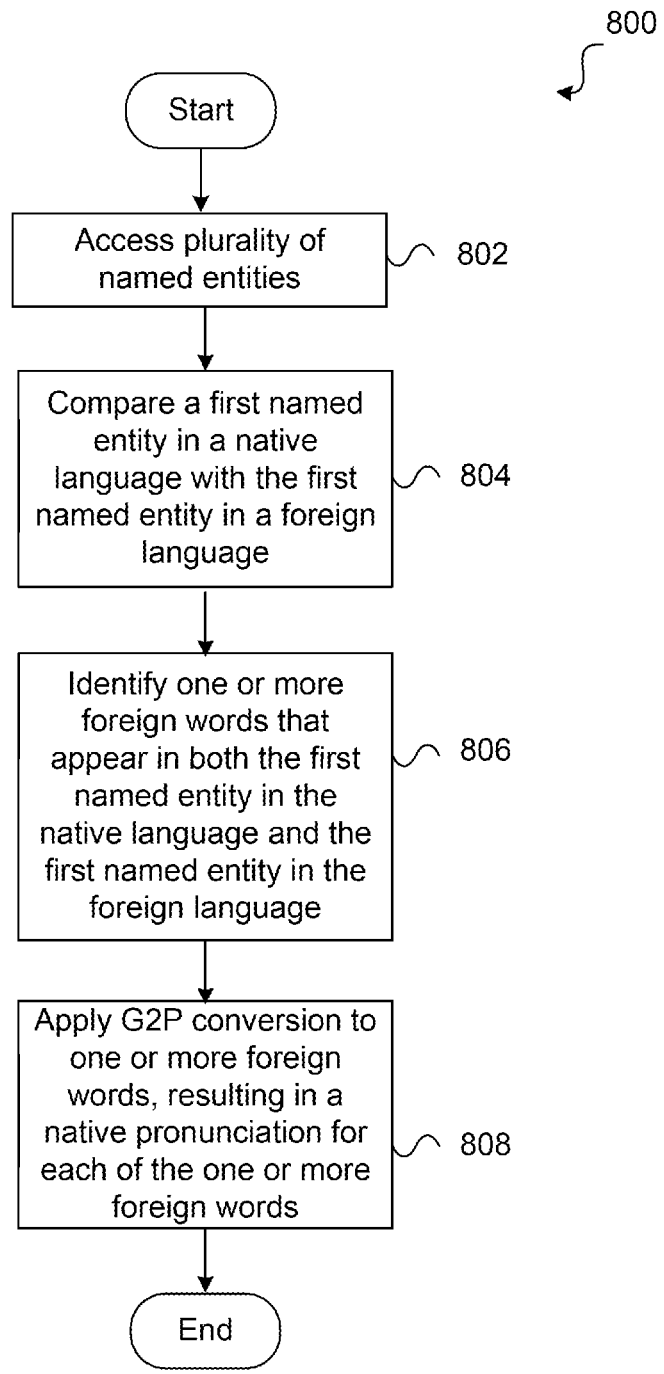
FIG. 8 depicts an illustrative flow diagram of an example process of applying a G2P conversion for recognizing multilingual named entities in accordance with one or more illustrative aspects described herein.

FIG. 8 is an illustrative flow diagram depicting an example process 800 of applying a G2P conversion for recognizing multilingual named entities in accordance with one or more features described herein. In one or more embodiments, process 800 and/or one or more steps thereof may be performed by a speech recognition system, such as system 200. For example, in one or more embodiments, process 800 illustrated in FIG. 8 and/or one or more steps thereof may be performed by a computing device (e.g., any device of FIG. 2). In other embodiments, process 800 illustrated in FIG. 8 and/or one or more steps thereof may be embodied in computer-executable instructions that are stored in a computer-readable medium, such as a non-transitory computer-readable memory. Alternatively or additionally, any of the steps in process 800 may be performed on any computing device (e.g., performed by a speech recognition system running on a computing device). In one or more embodiments, process 800 and/or one or more steps thereof may be performed prior to conducting speech recognition (e.g., during pre-processing of the system) in order to train the speech recognition system, such as system 200.

Process 800 may begin at step 802 in which a speech recognition system may access a plurality of named entities. For example, the ASR engine 204 and/or the G2P converter 216 may access a list comprising a plurality of named entities 218, wherein each named entity 218 is represented in a native language and a foreign language. At step 804, the system may compare a first named entity in a native language with the first named entity in a foreign language. For example, the ASR engine 204 and/or the G2P converter 216 may compare a first named entity in a native language with the first named entity in a foreign language. At step 806, the system may identify one or more foreign words that appear in both the first named entity in the native language and the first named entity in the foreign language. For example, the ASR engine 204 and/or the G2P converter 216 may identify one or more foreign words that appear in both the first named entity in the native language and the first named entity in the foreign language. At step 808, the system may apply a G2P conversion to the one or more foreign words, resulting in a native pronunciation for each of the one or more foreign words. For example, the P2P converter 214 and/or the G2P converter 216 may be used to apply a G2P conversion to the one or more foreign words, resulting in a native pronunciation for each of the one or more foreign words.

Figure 9:
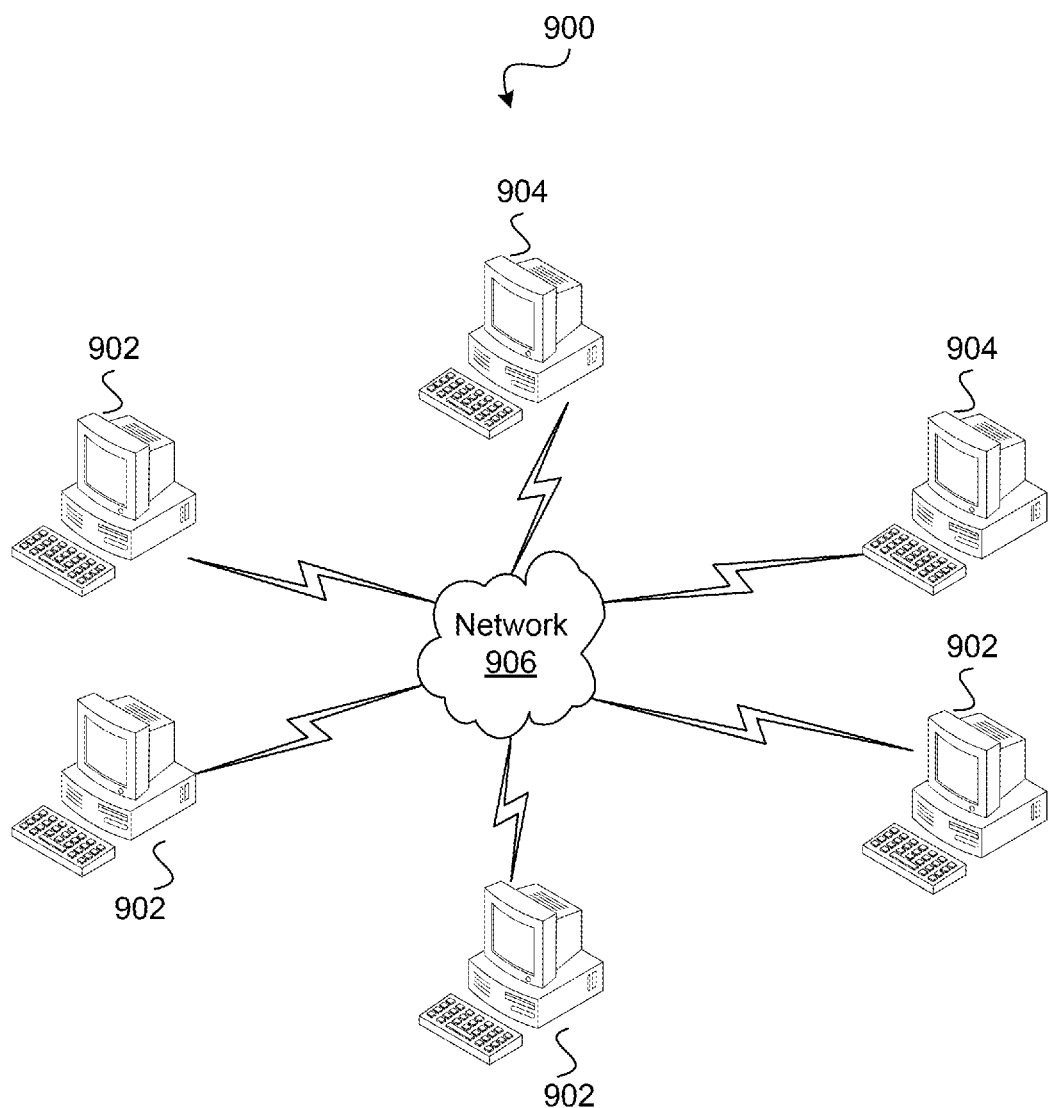
FIG. 9 depicts an example of an implementation of a computing environment in which aspects of the present disclosure may be implemented according to illustrative aspects described herein.

In FIG. 9, an example of an implementation of a computing environment 900 in which aspects of the present disclosure may be implemented is shown. Client computing devices 902 and server computing devices 904 provide processing, storage, and input/output devices executing application programs and the like. Client computing devices 902 may include, e.g., desktop computers, laptop computers, tablet computers, palmtop computers, smartphones, smart televisions, and the like. Client computing devices 902 can also be linked through communications network 906 to other computing devices, including other client devices computing devices 902 and server computing devices 904. Communications network 506 can be part of a remote access network, a global network (e.g., the Internet), a cellular network, a worldwide collection of computers, local area or wide area networks, and gateways that currently use respective protocols (TCP/IP, Bluetooth, etc.) to communicate with one another. Other electronic device/computer network architectures are suitable.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

One or more embodiments may be implemented in any conventional computer programming language. For example, embodiments may be implemented in a procedural programming language (e.g., "C") or an object-oriented programming language (e.g., "C++", Python). Some embodiments may be implemented as pre-programmed hardware elements, other related components, or as a combination of hardware and software components.

Embodiments can be implemented as a computer program product for use with a computer system. Such implementations may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions may embody all or part of the functionality previously described herein with respect to the system. Such computer instructions may be written in a number of programming languages for use with one or more computer architectures or operating systems. Furthermore, such instructions may be stored in any memory device, such as semiconductor, magnetic, optical, or other memory devices, and may be transmitted using any communications technology, such as optical, infrared, microwave, or other transmission technologies. Such a computer program product may be distributed as a removable medium with accompanying printed or electronic documentation (e.g., shrink wrapped software), preloaded with a computer system (e.g., on system ROM or fixed disk), or distributed from a server or electronic bulletin board over a network (e.g., the Internet or World Wide Web). Some embodiments may be implemented as a combination of both software (e.g., a computer program product) and hardware. Still other embodiments may be implemented as entirely hardware, or entirely software (e.g., a computer program product).

A described "process" is the performance of a described function in a computer using computer hardware (such as a processor, domain-programmable gate array, or other electronic combinatorial logic, or similar device), which may be operating under control of software or firmware or a combination of any of these or operating outside control of any of the foregoing. All or part of the described function may be performed by active or passive electronic components, such as transistors or resistors. Use of the term "process" does not necessarily imply a schedulable entity, although, in some embodiments, a process may be implemented by such a schedulable entity. Furthermore, unless the context otherwise requires, a "process" may be implemented using more than one processor or more than one (single- or multi-processor) computer and it may be an instance of a computer program or an instance of a subset of the instructions of a computer program.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may comprise one or more non-transitory computer-readable media.

As described herein, the various methods and acts may be operative across one or more computing devices and one or more networks. The functionality may be distributed in any manner, or may be located in a single computing device (e.g., a server, a client computer, or the like).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A method comprising:
   accessing, by a computing device, a list comprising a plurality of named entities, wherein:
      the plurality of named entities is represented in a first language and a second language; and
      the list comprises a mapping for the plurality of named entities in the first language to the second language;
   comparing a first named entity of the plurality of named entities in the first language with the first named entity in the second language;
   identifying one or more words that appear in both the first named entity in the first language and the first named entity in the second language without translation of the one or more words;
   applying, using a grapheme-to-phoneme converter, a grapheme-to-phoneme conversion to the one or more words identified, resulting in a native pronunciation for the one or more words; and
   training the grapheme-to-phoneme converter based on the native pronunciation for the one or more words.

2. The method of claim 1, wherein applying the grapheme-to-phoneme conversion to the one or more words further comprises:
   mapping phonemes of words in a second language dictionary to phonemes in the first language, resulting in a mapped native pronunciation for the words in the second language dictionary using the phonemes in the first language;
   wherein training includes training the grapheme-to-phoneme converter based on the mapped native pronunciation for the words in the second language dictionary; and
   mapping graphemes of the one or more words to the phonemes in the first language based on the graphemeto-phoneme converter, resulting in the native pronunciation for the one or more words.

3. The method of claim 1, wherein accessing the list comprising the plurality of named entities further comprises:
determining a subset of named entities that match at least one predefined criterion; and
removing the subset of named entities from the list comprising the plurality of named entities.

4. The method of claim 3, wherein the at least one predefined criterion is based on at least one of meta information, string similarity metric, and a language identification.

5. The method of claim 1, further comprising:
determining a subset of the one or more words that match at least one predefined metric; and
removing the subset of the one or more words from the one or more words identified.

6. The method of claim 1, further comprising: adding the one or more words and the native pronunciation for the one or more words to a recognition dictionary.

7. The method of claim 6, further comprising: adding the one or more words as a token to the recognition dictionary, wherein the token indicates one of a single word and a multi-word phrase.

8. The method of claim 7, further comprising:
receiving, by the computing device, a natural language input comprising the one or more words; and
performing speech recognition of the natural language input by identifying the one or more words as the token added to the recognition dictionary.

9. The method of claim 1, further comprising: accessing the list comprising the plurality of named entities in a multilingual database.

10. The method of claim 1, further comprising:
obtaining a first list comprising named entities in the first language and a second list comprising named entities in the second language;
comparing the first list and the second list by string similarity analysis; and
compiling the list comprising the plurality of named entities based on the string similarity analysis results, wherein the plurality of named entities is represented in the first language and the second language.

11. The method of claim 10, wherein the string similarity analysis comprises at least one of edit distance analysis, longest common substring analysis, and another string metric.

12. A system comprising:
at least one processor; and
at least one memory storing computer-readable instructions that, when executed by the at least one processor, cause the system to:
access a list comprising a plurality of named entities, wherein:
the plurality of named entities is represented in a first language and a second language; and
the list comprises a mapping for the plurality of named entities in the first language to the second language;
compare a first named entity of the plurality of named entities in the first language with the first named entity in the second language;
identify one or more words that appear in both the first named entity in the first language and the first named entity in the second language without translation of the one or more words;
apply, using a grapheme-to-phoneme converter, a grapheme-to-phoneme conversion to the one or more words identified, resulting in a native pronunciation for the one or more words; and
train the grapheme-to-phoneme converter based on the native pronunciation for the one or more words.

13. The system of claim 12, wherein the computer-readable instructions, when executed, cause the system to:
map phonemes of words in a second language dictionary to phonemes in the first language, resulting in a mapped native pronunciation for the words in the second language dictionary using the phonemes in the first language;
train the grapheme-to-phoneme converter based on the mapped native pronunciation for the words in the second language dictionary; and
map graphemes of the one or more words to the phonemes in the first language based on the grapheme-to-phoneme converter, resulting in the native pronunciation for the one or more words.

14. The system of claim 12, wherein the computer-readable instructions, when executed, cause the system to: add the one or more words and the native pronunciation for the one or more words to a recognition dictionary.

15. One or more non-transitory computer-readable media having instructions stored thereon, which when executed, cause a computing device to perform operations comprising:
accessing a list comprising a plurality of named entities, wherein:
the plurality of named entities is represented in a first language and a second language; and
the list comprises a mapping for the plurality of named entities in the first language to the second language;
comparing a first named entity of the plurality of named entities in the first language with the first named entity in the second language;
identifying one or more words that appear in both the first named entity in the first language and the first named entity in the second language without translation of the one or more words;
applying, using a grapheme-to-phoneme converter, a grapheme-to-phoneme conversion to the one or more words identified, resulting in a native pronunciation for the one or more words; and
training the grapheme-to-phoneme converter based on the native pronunciation for the one or more words.

16. The non-transitory computer-readable media of claim 15, wherein applying the grapheme-to-phoneme conversion to the one or more foreign words comprises:
mapping phonemes of words in a second language dictionary to phonemes in the first language, resulting in a mapped native pronunciation for the words in the second language dictionary using the phonemes in the first language;
wherein training includes training the grapheme-to-phoneme converter based on the mapped native pronunciation for the words in the second language dictionary; and
mapping graphemes of the one or more words to the phonemes in the first language based on the grapheme-to-phoneme converter, resulting in the native pronunciation for the one or more words.

17. The one or more non-transitory computer-readable media of claim 15, wherein the operations further comprise: adding the one or more words and the native pronunciation for the one or more words to a recognition dictionary.

18. The one or more non-transitory computer-readable media of claim 17, wherein the operations further comprise: adding the one or more words as a token to the recognition dictionary, wherein the token indicates one of a single word and a multi-word phrase.

19. The one or more non-transitory computer-readable media of claim 15, wherein the operations further comprise:
   obtaining a first list comprising named entities in the first language and a second list comprising named entities in the second language;
   comparing the first list and the second list by string similarity analysis; and
   compiling the list comprising the plurality of named entities based on the string similarity analysis results, wherein the plurality of named entities is represented in the first language and the second language.

20. The one or more non-transitory computer-readable media of claim 19, wherein the string similarity analysis comprises at least one of edit distance analysis, longest common substring analysis, and another string metric.

* * * * *